United States Patent Office 3,369,885
Patented Feb. 20, 1968

3,369,885
PROCESS FOR PRILLED UREA-POTASSIUM METAPHOSPHATE FERTILIZER
Takeshi Takahashi, Fujisawa, Haruo Toyoda, Yokohama, Toshihiko Kakizaki, Tokyo-to, Japan, assignors to Toyo Koatsu Industries, Incorporated, a corporation of Japan
No Drawing. Filed Feb. 12, 1965, Ser. No. 432,384
Claims priority, application Japan, Feb. 12, 1964, 39/7,134, 39/7,135
7 Claims. (Cl. 71—29)

ABSTRACT OF THE DISCLOSURE

A process for producing granular compound fertilizers containing high analyses of nitrogen, phosphorus and potassium which comprises forming a suspension melt by dispersing potassium metaphosphate in a urea melt or by mixing urea and potassium metaphosphate and heating the mixture to melt the urea and prilling the suspension melt.

---

This invention relates to a process for producing granular compound fertilizers containing urea and potassium metaphosphate.

In producing granular compound fertilizers containing urea, generally a pan granulation method comprising mixing raw materials for a fertilizer, adding a proper amount of water to the resulting mixture, granulating the mixture by rolling it in a rotary granulator and drying the resulting granules is used. This method, however, is not efficient.

On the other hand, a known process for producing granular compound fertilizers containing urea a prilling granulation method comprising adding a melting point reducing agent as required to a mixture of urea and a potassium salt, heating the mixture to form a melt, adding ammonium phosphate to the melt, uniformly melting the resulting mixture and prilling by dropping it as droplets through nozzles into a cooling tower. However, this method is so complicated to operate that it can not be said to be industrially adaptable.

Further, there is known a process for producing a compound fertilizer containing nitrogen, phosphorus and potassium by a prilling method comprising adding a small amount of water to a mixture of urea and potassium chloride, heating the mixture to about 100° C. to form a solution, adding a calcined phosphate fertilizer and/or a fused phosphate fertilizer and then a finely powdered enriched calcined phosphate and/or calcium superphosphate to the solution, stirring the resulting mixture to form a pasty suspension melt, and then prilling the suspension melt to form a granular compound fertilizer. However, this method is also complicated to operate. Further, a violent stirring is required to uniformly suspend the calcined phosphate fertilizer or the fused phosphate fertilizer in the melt. Such stirring tends to accelerate the conversion of the urea to a biuret.

An object of the present invention is to provide an improved process for producing a granular high analysis compound fertilizer.

Another object of the present invention is to provide a process for producing granular compound fertilizer containing nitrogen, phosphorus and potassium high in hardness, low in hygroscopicity and in caking tendency.

A further object of the present invention is to provide a process for producing a granular compound fertilizer containing phosphorus difficult to fix to the soil.

A still further object of the present invention is to provide a process for producing a granular compound fertilizer containing phosphorus in slightly soluble and easily soluble form.

The objects of the present invention are attained by mixing potassium metaphosphate with urea, and heating the mixture under stirring whereby the urea is melted and the potassium metaphosphate is dispersed uniformly in the resulting urea melt to form a suspension melt, or adding potassium metaphosphate to a urea melt under stirring whereby the potassium metaphosphate is dispersed uniformly in the urea melt to form a potassium metaphosphate suspension melt, and prilling the thus-preprepared suspension melt to form a granular compound fertilizer. In prilling the suspension melt, there can be adopted such known methods as dropping or jetting the suspension melt as liquid droplets through nozzles into a prilling tower and cooling the liquid droplets with air so they are solidified, by dropping the suspension melt as liquid droplets into a cooled liquid which does not dissolve urea, and cooling the drops so they are solidified, or by feeding the suspension melt onto a rotating disk so as to be dispersed as liquid droplets in a prilling tower by a centrifugal force and cooling the droplets with air so they are solidified.

When urea and potassium metaphosphate are mixed and melted or potassium metaphosphate is added to a urea melt, the potassium metaphosphate gels and disperses easily in the urea melt and a suspension melt of a viscosity low enough for the suspension to be dropped through nozzles so as to be able to be granulated is obtained.

For example, the viscosity of a suspension melt prepared by adding 100 parts of potassium metaphosphate (of 59.2% $P_2O_5$ and 39.6% $K_2O$) of particle size smaller than 100 meshes per inch to 100 parts of a urea melt at 135° C. and under stirring was 400 centipoises as measured with a rotating disk type viscosimeter. On the other hand, a suspension melt prepared by adding 100 parts of monoammonium phosphate (of 12.1% N and 61.5% $P_2O_5$) to 100 parts of a urea melt at 135° C. and under stirring was a gel and it was impossible not only to measure its viscosity but also to prill the suspension melt by dropping or jetting it through nozzles.

The finer the particle size of the potassium metaphosphate to be used in the present invention, the better the result. It is preferable to use potassium metaphosphate of a particle size smaller than 100 mesh per inch. It is preferable to add at most 120 parts of potassium metaphosphate to 100 parts of urea. If the amount of potassium metaphosphate to be added is increased beyond the above mentioned rate the viscosity of the suspension increases and fluidity of the suspension decreases. It is preferable to add 30 to 120 parts of potassium metaphosphate to 100 parts of urea.

As potassium metaphosphate disperses as a gel form, a uniform suspension melt is easily obtained even with a slight mechanical stirring. However, if a nonionic surface active agent or an anionic surface active agent is present in the suspension melt or a supersonic oscillation stirrer is used for the stirring or both of the surface active agent and the supersonic oscillation stirring are used, the suspension melt is more improved in its stabiltiy.

Further, in a product consisting only of urea and potassium metaphosphate, the ratio of the phosphorus to potassium is inevitably 1 to 0.67 from the composition of the potassium metaphosphate, and the potassium content may become short depending on the nature of the soil and the kind of crop. This defect can be eliminated by the method comprising mixing potassium chloride or potassium sulfate of particle size smaller than 60 meshes per inch with urea and potassium metaphosphate and heating the resulting mixture under stirring, or adding potassium chloride or potassium sulfate of particle size smaller than 60 meshes per inch together with potassium metaphosphate to a urea melt under stirring, whereby, a uniform suspension melt is obtained, and prilling the thus-obtained suspension to obtain a granular product high in potassium content. The amount of potassium chloride or potassium sulfate that can be added in this case is preferably not more than 40 parts for 100 parts of potassium metaphosphate. If it is more than that, the viscosity of the suspension melt becomes so high that it is difficult to jet or drop the suspension melt as liquid droplets through nozzles and the composition of the suspension melt tends to become nonuniform.

According to the present invention, a granular NPK compound fertilizer can be obtained much more easily than by any conventional method. The thus-obtained compound fertilizer is higher in analysis, is lower in hygroscopicity and caking tendency and is lower in biuret content than any conventional granular compound fertilizer obtained by prilling granulation. Further, the phosphorus contained therein is difficult to fix to the soil.

However, the compound fertilizer according to the present invention has a defect that the phosphorus therein is so slightly soluble that the initial growth of the plants is a little lower. This defect can be eliminated by adding an orthophosphate to the compound fertilizer. However, in a process of dispersing potassium metaphosphate and an orthophosphate in a urea melt and prilling the resulting suspension melt, the added orthophosphate easily condenses to become a condensed phosphate such as a pyro- or tripolyphosphate and the object of adding it is not attained. In order to inhibit the production of condensed phosphates in this process, it is necessary to adopt a method comprising mixing potassium metaphosphate and an orthophosphate with urea and heating under stirring the resulting mixture in the presence of water to obtain a suspension melt, or adding under stirring potassium metaphosphate and an orthophosphate to a urea melt in the presence of water to obtain a suspension melt, and prilling the thus-obtained suspension melt to form a granular compound fertilizer.

It is preferable that the amount of water to be added in such case is large. But when the amount of water is large, drying of the product is necessary and it is not economical. Therefore, the amount of water is preferably kept at the minimum that can prevent the condensation of the orthophosphate. It is preferably less than 10% based on the raw material. The optimum amount is 3 to 5%.

The orthophosphate to be added may be one which can be used as a fertilizer such as, monoammonium phosphate, potassium dihydrogen phosphate or urea phosphate. The preferable amount of orthophosphate to be added is less than 50% and specifically 20 to 35% of the total phosphorus in view of the viscosity and fluidity of the suspension melt. Further, as the fluidity is improved by the addition of ammonium nitrate or ammonium chloride, it may be added as required.

The thus-obtained granular compound fertilizer has the same physical properties as one obtained by prilling the suspension melt of potassium metaphosphate in urea, further contains water-soluble phosphorus and therefore has a favorable effect on the initial growth of plants.

The present invention is not to be limited to the following examples wherein parts and percentages are by weight.

EXAMPLE 1

100 parts of urea were melted by being heated at 130° C. 75 parts of potassium metaphosphate (of 59.2% $P_2O_5$ and 39.6% $K_2O$) were added to the melt. The resulting mixture was stirred with a stirrer so that the potassium metaphosphate might be uniformly dispersed in the urea melt. By dropping the resulting suspension through nozzles of an orifice diameter of 1.0 mm. into a prilling tower 20 m. high and 1.4 m. in diameter, 175 parts of a granular product were obtained. The composition of the product was as follows:

|  | Percent |
|---|---|
| Total N | 26.2 |
| Total $P_2O_5$ | 26.4 |
| Total $K_2O$ | 17.3 |

EXAMPLE 2

100 parts of potassium metaphosphate (of 59.2% $P_2O_5$ and 39.6% $K_2O$) and 1 part of a naphthalene sulfonic acid formalin condensate were mixed with 100 parts of urea. The resulting mixture was heated to 135° C. and stirred with a supersonic wave stirrer so that the potassium metaphosphate might be uniformly dispersed in the urea melt. 200 parts of a granular product were obtained by the same prilling method as in Example 1. The composition of the product was as follows:

|  | Percent |
|---|---|
| Total N | 22.9 |
| Total $P_2O_5$ | 30.8 |
| Total $K_2O$ | 20.6 |

The results of the tests of the hardness and hygroscopicity of the products obtained in Examples 1 and 2 and the biuret content in the products are shown in Table 1. For comparison, there are also given the results of the measurements of a sample A produced by prilling urea, ammonium phosphate and potassium chloride as raw materials and a sample B produced by the pan granulation method from the same raw materials. The methods of producing these samples were as follows.

Sample A 242 parts of potassium chloride (of 60% $K_2O$) were added to 346 parts of urea and the resulting mixture was heated to 135° C. to be melted. Then 412 parts of monoammonium phosphate (of 12% N and 50% $P_2O_5$) were added to the resulting melt while stirring and heating to form a uniform melt solution. 1000 parts of a granular product were obtained by the same prilling method as in Example 1. The composition of the product was as follows:

|  | Percent |
|---|---|
| Total N | 20.8 |
| Soluble $P_2O_5$ | 20.6 |
| Water soluble $K_2O$ | 20.5 |

Sample B 242 parts of potassium chloride (of 60% $K_2O$) and 412 parts of monoammonium phosphate (of 12% N and 50% $P_2O_5$) were mixed with 346 parts of urea. 1000 parts of a granular product were obtained by granulating the resulting mixture with a Rosche granulator of a pan diameter of 3 m. while spraying with water and drying the thus-obtained granules with a rotary dryer. The composition of the product was as follows:

|  | Percent |
|---|---|
| Total N | 20.8 |
| Soluble $P_2O_5$ | 20.6 |
| Water soluble $K_2O$ | 20.5 |

TABLE 1

| Samples | Hardness in kg. [1] | Hygroscopicity in percent [2] | Biuret content in percent |
|---|---|---|---|
| Product by Example 1 | 3.0 | 9.5 | 0.30 |
| Product by Example 2 | 3.1 | 8.9 | 0.28 |
| A | 2.4 | 28.3 | 0.45 |
| B | 1.2 | 30.9 | 0.24 |

[1] Average value of 20 granules of 6 to 8 meshes per inch.
[2] Amount of increase in percent of the weight after 24 hours at a temperature of 30° C. and a humidity of 80%.

EXAMPLE 3

9 parts of water were added to 100 parts of urea and the resulting mixture was heated to be melted. 50 parts of potassium metaphosphate (of 59.2% $P_2O_5$ and 39.6% of $K_2O$) and 25 parts of monoammonium phosphate (of 12.1% N and 61.5% $P_2O_5$) were added to the resulting melt. The melt was stirred at a fixed temperature for 5 minutes to form a uniform suspension melt. 180 parts of a granular product were obtained by the same prilling method as in Example 1. The amounts of orthophosphoric acid remaining in this product were measured by an ion-exchange chromatography and are shown in table 2. For comparison, there are also given the amounts of orthophosphoric acid remaining in the product obtained by melting 100 parts of urea without adding water (by adding 6 parts of ammonium nitrate as a melting point lowering agent in the case of producing a molten state at a temperature below the inherent melting point of urea), adding 50 parts of potassium metaphosphate and 25 parts of monoammonium phosphate to the resulting melt while stirring the melt at a fixed temperature for 5 minutes to obtain a suspension melt and prilling the mixture by the same prilling method as in Example 1.

TABLE 2

|  | Temperature in °C. | Amount of orthophosphoric acid remaining in percent |
|---|---|---|
| In case water was added | 120 | 87.3 |
|  | 125 | 82.5 |
|  | 130 | 73.1 |
|  | 135 | 63.3 |
| In case water was not added | *120 | 62.5 |
|  | *125 | 43.7 |
|  | *130 | 27.3 |
|  | 135 | 12.1 |

*The temperature marked with the asterisk shows that ammonium nitrate was added.

EXAMPLE 4

6 parts of water were added to 100 parts of melted urea. While the temperature was kept at about 125° C., 50 parts of potassium metaphosphate (of 59.2% $P_2O_5$ and 39.6% $K_2O$) and 12 parts of potassium dihydrogenphosphate (of 52.0% $P_2O_6$ and 34.2% $K_2O$) were added to the resulting mixture. The mixture was stirred to form a uniform suspension melt. 165 parts of a granular product were obtained by the same prilling method as in Example 1. The remaining rate of the orthophosphoric acid in the product was 82.1%. The composition of the product was as follows:

|  | Percent |
|---|---|
| Total N | 27.8 |
| Total $P_2O_5$ | 21.4 |
| Total $K_2O$ | 14.2 |

EXAMPLE 5

50 parts of potassium metaphosphate (of 59.2% $P_2O_5$ and 39.6% $K_2O$), 25 parts of monoammonium phosphate (of 12.1% N and 61.5% $P_2O_5$) and 6 parts of ammonium nitrate were added to 100 parts of urea containing 9% water. The resulting mixture was melted at about 120° C. while being stirred so as to form a uniform suspension. 175 parts of a granular product were obtained by the same prilling method as in Example 1.

The amount of the orthophosphoric acid remaining in the product was 87.2%. The composition of the product was as follows:

|  | Percent |
|---|---|
| Total N | 26.6 |
| Total $P_2O_5$ | 25.6 |
| Total $K_2O$ | 11.2 |

What is claimed is:

1. A process for producing granular compound fertilizers containing nitrogen, phosphorus and potassium in high analysis which comprises dispersing from 30 to 120 parts by weight potassium metaphosphate in 100 parts of a urea melt to form a suspension melt, and prilling the suspension melt to form a granular compound fertilizer.

2. A process as claimed in claim 1 wherein a potassium salt of particle size smaller than 60 meshes per inch selected from the group consisting of potassium chloride and potassium sulfate is dispersed together with potassium metaphosphate in a urea melt to form a suspension melt.

3. A process for producing granular compound fertilizers containing nitrogen, phosphorus and potassium in high analysis which comprises mixing from 30 to 120 parts by weight potassium metaphosphate with 100 parts urea, heating the resulting mixture under stirring whereby the urea is melted and the potassium metaphospate is dispersed uniformly in the resulting urea melt to form a suspension melt, and prilling the suspension melt to form a granular compound fertilizer.

4. A process as claimed in claim 3 wherein the potassium metaphosphate is of a particle size smaller than 100 meshes per inch.

5. A process as claimed in claim 3 wherein a potassium salt of particle size smaller than 60 meshes per inch selected from the group consisting of potassium chloride and potassium sulfate is mixed with the mixture of potassium metaphosphate and urea.

6. A process as claimed in claim 1 wherein an orthophosphate is also dispersed in the urea melt and wherein the dispersion is conducted in the presence of water.

7. A process as claimed in claim 3 wherein the mixture also contains an orthophosphate and wherein the heating is conducted in the presence of water.

References Cited

UNITED STATES PATENTS 3,026,193  3/1962  Baynham _____ 71—64 X
3,132,020  5/1964  Tesche et al. _____ 71—64 X

FOREIGN PATENTS 943,595  12/1963  Great Britain.

OTHER REFERENCES

Kirk-Othmer, Encyclopedia of Chemical Technology (1st ed.), vol. 10, Interscience, New York (1953), pages 423-4, 441.

DONALL H. SYLVESTER, *Primary Examiner.*

T. D. KILEY, *Assistant Examiner.*